United States Patent
Kim et al.

(10) Patent No.: US 10,054,190 B2
(45) Date of Patent: Aug. 21, 2018

(54) POWER TRANSMISSION MEMBER FOR ELECTRIC POWER STEERING SYSTEM

(71) Applicant: MANDO CORPORATION, Pyeongtaek-si, Gyeonggi-do (KR)

(72) Inventors: Jong Han Kim, Seoul (KR); Hong Yong Bhae, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 118 days.

(21) Appl. No.: 15/253,312

(22) Filed: Aug. 31, 2016

(65) Prior Publication Data
US 2017/0058991 A1    Mar. 2, 2017

(30) Foreign Application Priority Data
Sep. 1, 2015    (KR) .......................... 10-2015-0123784

(51) Int. Cl.
| | | |
|---|---|---|
| B62D 5/04 | (2006.01) | |
| F16F 15/12 | (2006.01) | |
| F16D 3/12 | (2006.01) | |
| F16H 57/00 | (2012.01) | |
| F16D 3/68 | (2006.01) | |
| F16F 1/377 | (2006.01) | |
| F16H 57/021 | (2012.01) | |
| F16H 1/16 | (2006.01) | |
| F16H 57/039 | (2012.01) | |
| F16H 57/022 | (2012.01) | |
| F16H 57/12 | (2006.01) | |

(52) U.S. Cl.
CPC ........ *F16F 15/1201* (2013.01); *B62D 5/0409* (2013.01); *F16D 3/12* (2013.01); *F16D 3/68* (2013.01); *F16F 1/377* (2013.01); *F16H 57/0006* (2013.01); *B62D 5/04* (2013.01); *F16H 1/16* (2013.01); *F16H 57/039* (2013.01); *F16H 2057/0213* (2013.01); *F16H 2057/0222* (2013.01); *F16H 2057/127* (2013.01)

(58) Field of Classification Search
CPC .......... F16D 3/68; F16D 3/12; F16F 15/1201; F16F 1/377; B62D 5/049; B62D 5/04; F16H 57/0006; F16H 1/16; F16H 2057/127; F16H 57/039; F16H 2057/0222; F16H 2057/0213
USPC ........................ 464/74, 75, 78, 169; 180/444
See application file for complete search history.

(56) References Cited

U.S. PATENT DOCUMENTS

| | | | | |
|---|---|---|---|---|
| 2,004,299 | A * | 6/1935 | Snyder | ...................... F16D 3/68 464/75 |
| 2,595,818 | A * | 5/1952 | Smila | ...................... B25B 23/14 |

(Continued)

*Primary Examiner* — Greg Binda
(74) *Attorney, Agent, or Firm* — McDermott Will & Emery LLP

(57) ABSTRACT

A power transmission member for an electric power steering system, which connects a driving shaft and a driven shaft on the same axis to transmit power therebetween, includes: a first boss coupled to one of the driving shaft and the driven shaft and having a first receiving part that is formed in the central portion thereof and has a cylindrical shape; a second boss coupled to the other shaft and having a second receiving part that is formed in the central portion thereof and has a cylindrical shape; and an axial damper configured to elastically deform in the axial direction while opposite end portions thereof are inserted into the first and second receiving parts.

12 Claims, 9 Drawing Sheets

(56) References Cited

U.S. PATENT DOCUMENTS

| | | | | |
|---|---|---|---|---|
| 4,437,847 A | * | 3/1984 | Calistrat | F16D 3/68 |
| | | | | 464/74 |
| 6,460,650 B2 | * | 10/2002 | Tsuboi | B62D 5/0409 |
| | | | | 180/444 |
| 8,182,349 B2 | * | 5/2012 | Ross | F16D 3/72 |
| | | | | 464/78 |
| 8,505,675 B2 | * | 8/2013 | Suzuki | B62D 5/0409 |
| | | | | 180/444 |

* cited by examiner

POWER TRANSMISSION MEMBER FOR ELECTRIC POWER STEERING SYSTEM

CROSS REFERENCE TO RELATED APPLICATION

This application claims priority from Korean Patent Application No. 10-2015-0123784, filed on Sep. 1, 2015, which is hereby incorporated by reference for all purposes as if fully set forth herein.

BACKGROUND OF THE INVENTION

1. Field of the Invention

The present invention relates to a power transmission member for an electric power steering system. More specifically, the present invention relates to a power transmission member for an electric power steering system that can more effectively reduce noise caused by the clearance between inner and outer rotors, compared with a power transmission member in the related art, and can prevent noise caused by collision and vibration at the portion to which a driving shaft and a driven shaft are coupled while transmitting power.

2. Description of the Prior Art

A steering apparatus for a vehicle is an apparatus for allowing a driver to freely change the progress direction of the vehicle by rotating the steering wheel. The steering apparatus arbitrarily changes the center of rotation about which the vehicle's front wheels turn to assist the driver to drive the vehicle in a desired direction. The steering apparatus uses a power steering system as an auxiliary power mechanism in order to reduce the driver's force. A power steering system is broadly divided into a hydraulic power steering system that uses hydraulic pressure that assists with a steering force by operating a hydraulic pump using the force of an engine and an electric power steering system that uses an electric motor.

A hydraulic power steering system assists with a driver's steering force by detecting the rotation of a steering wheel, operating a hydraulic pump using a rotational force transmitted from an engine, and transmitting hydraulic pressure to a driving unit, such as a cylinder, which is provided on a rack bar or a steering column.

An electric power steering system enables a steering apparatus to effectively operate by detecting the rotation of a steering wheel and operating a motor that is installed on a rack or a steering column to assist with a rotary motion. An electric power steering system is divided into a rack assist type electric power steering system (R-EPS) and a column type electric power steering system (C-EPS).

FIG. 1 is a schematic view of an electric power steering system in the related art.

As illustrated in FIG. 1, the electric power steering system includes a steering system 100 that extends from a steering wheel 101 to wheels 108 and an auxiliary power device 120 that provides auxiliary steering power for the steering system 100.

The steering system 100 includes a steering column 102 that is connected, at one side thereof, to the steering wheel 101 to rotate together with the steering wheel 101 and is connected, at the opposite side thereof, to a pinion shaft 104 through a pair of universal joints 103. The pinion shaft 104 is connected to a rack bar through a rack-pinion mechanism 105, and the opposite ends of the rack bar are connected to the wheels 108 of the vehicle through tie rods 106 and knuckle arms 107. The rack-pinion mechanism 105 is constituted by a pinion gear 111 and a rack gear 112 that are engaged with each other, in which the pinion gear 111 is formed on the pinion shaft 104 and the rack gear 112 is formed on one side of the outer circumferential surface of the rack bar. When a driver operates the steering wheel 101, a torque is generated in the steering system 100, and the wheels 108 are turned by the torque through the rack-pinion mechanism 105 and the tie rods 106.

The auxiliary power device 120 includes: a torque sensor 125 that senses the torque applied to the steering wheel 101 by a driver and outputs an electrical signal proportional to the detected torque; an electronic control unit (ECU) 123 that generates a control signal on the basis of the electrical signal transmitted from the torque sensor; a motor 130 that generates auxiliary power on the basis of the signal transmitted from the electronic control unit 123; and a speed reducer 140 that transmits the auxiliary power generated by the motor to the steering column 102.

FIG. 2 is a partially sectioned view illustrating a power transmission member of the electric power steering system in the related art.

As illustrated in FIG. 2, the power transmission member of the electric power steering system includes a motor 130, a driving shaft 205, an inner rotor 220, an outer rotor 215, a resilient body 210, a first bearing 250, a worm shaft 235, a worm gear 245, a second bearing 270, a compression screw 255, a compression spring 265, and a gear housing 260.

The motor 130 has the driving shaft 205 that extends from the motor housing to the outside, and the outer rotor 215 has an empty space therein and is connected, at one side thereof, with the driving shaft 215 to operate in conjunction with the driving shaft 215. The first and second bearings 250 and 270 fix the worm gear 245 such that the worm gear 245 is directed toward the worm wheel gear 240 installed on the steering column. The compression spring 265 supports the worm gear 245 toward the worm wheel gear 240 through the compression screw 255 and supports the second bearing 270. Accordingly, when the compression screw 255 is tightened, the compression screw 255 moves to compress the compression spring 265 such that the worm gear 245 may be firmly engaged with the worm wheel gear 240 by the compressive force of the compression spring 265.

The inner rotor 220 is connected to the worm shaft 235 and is inserted into the outer rotor 215 that is connected with the driving shaft 205 at one side thereof.

However, since the power transmission member of the electric power steering system in the related art has a structure in which the inner rotor is coupled to the outer rotor through simple press-fit and makes direct contact with the inside of the outer rotor, a large impact is inversely input through the steering column to cause the wear of the clearance and to cause noise that is due to contact when the vehicle is aging or traveling on a road, such as an off-road.

Furthermore, a process of assembling the inner rotor and the outer rotor and a process of applying grease to the space therebetween are required, which causes an increase in the assembly process and cost.

SUMMARY OF THE INVENTION

In this background, an aspect of the present invention is to provide a power transmission member for an electric power steering system that can more effectively reduce noise caused by the clearance between inner and outer rotors, compared with a power transmission member in the related art, and can prevent noise caused by collision and vibration at the portion to which a driving shaft and a driven shaft are coupled while transmitting power.

Furthermore, the aspect of the present invention is not limited thereto, and other unmentioned aspects of the present invention may be clearly appreciated from the following description by those skilled in the art.

In accordance with an aspect of the present invention, there is provided a power transmission member for an electric power steering system that connects a driving shaft and a driven shaft on the same axis to transmit power therebetween, the power transmission member including: a first boss coupled to one of the driving shaft and the driven shaft and having a first receiving part that is formed in the central portion thereof and has a cylindrical shape; a second boss coupled to the other shaft and having a second receiving part that is formed in the central portion thereof and has a cylindrical shape; and an axial damper configured to elastically deform in the axial direction while opposite end portions thereof are inserted into the first and second receiving parts.

As described above, according to the present invention, the power transmission member can more effectively reduce noise caused by the clearance between the inner and outer rotors, compared with a power transmission member in the related art, and can prevent noise caused by collision and vibration at the portion to which the driving shaft and the driven shaft are coupled while transmitting power.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
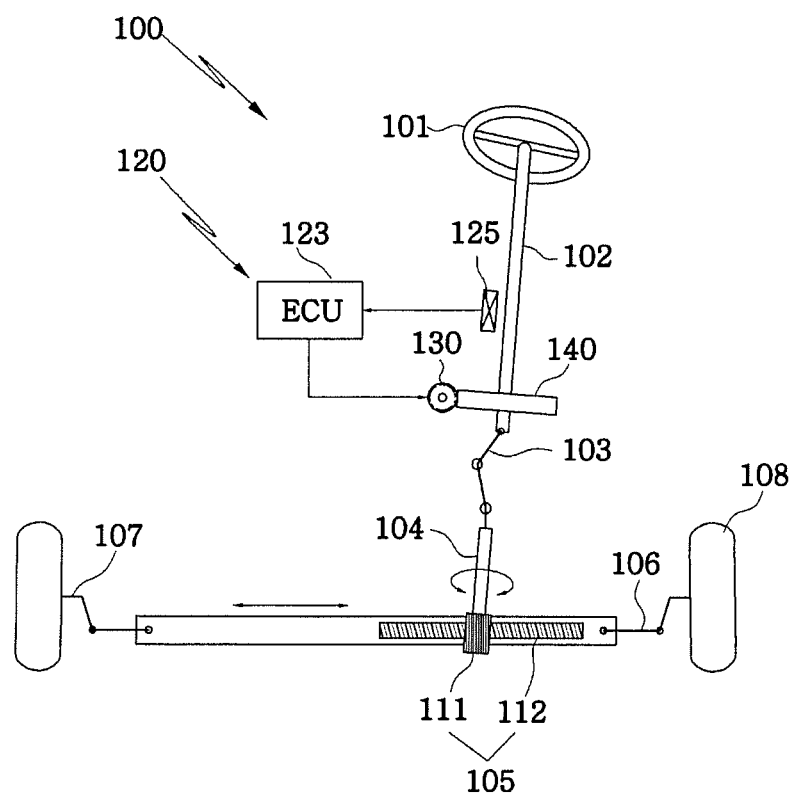
FIG. 1 is a schematic view of an electric power steering system in the related art.
Figure 2:
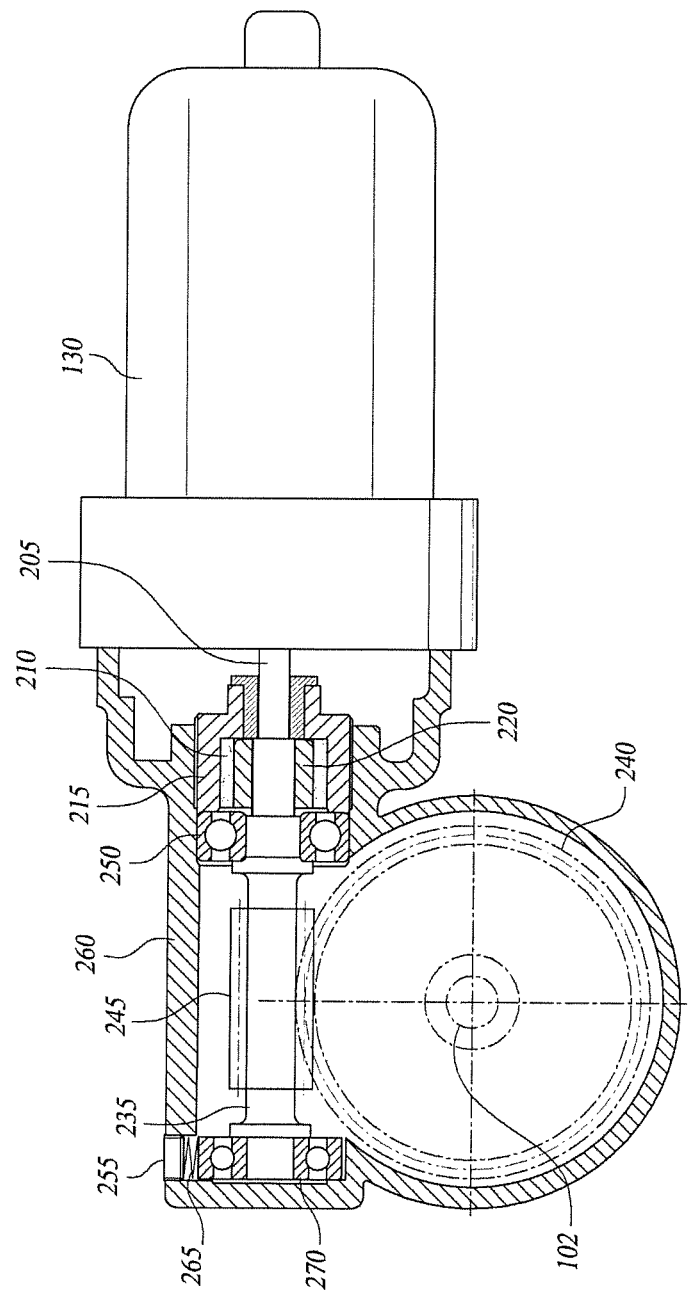
FIG. 2 is a partially sectioned view illustrating a power transmission member of the electric power steering system in the related art.

Hereinafter, embodiments of the present invention will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
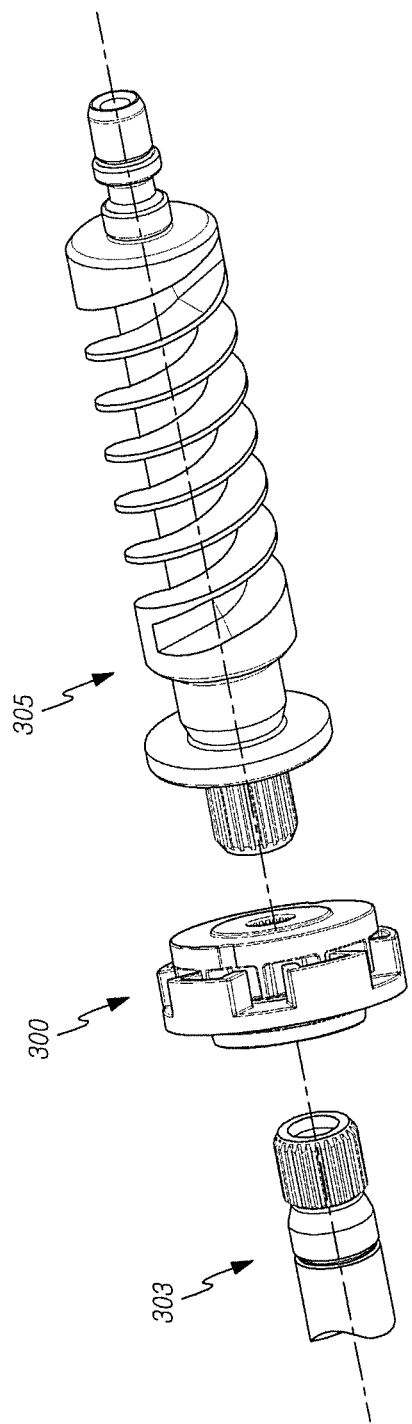
FIG. 3 is a perspective view illustrating a coupled state of a power transmission member of an electric power steering system according to the present invention.
Figure 4:
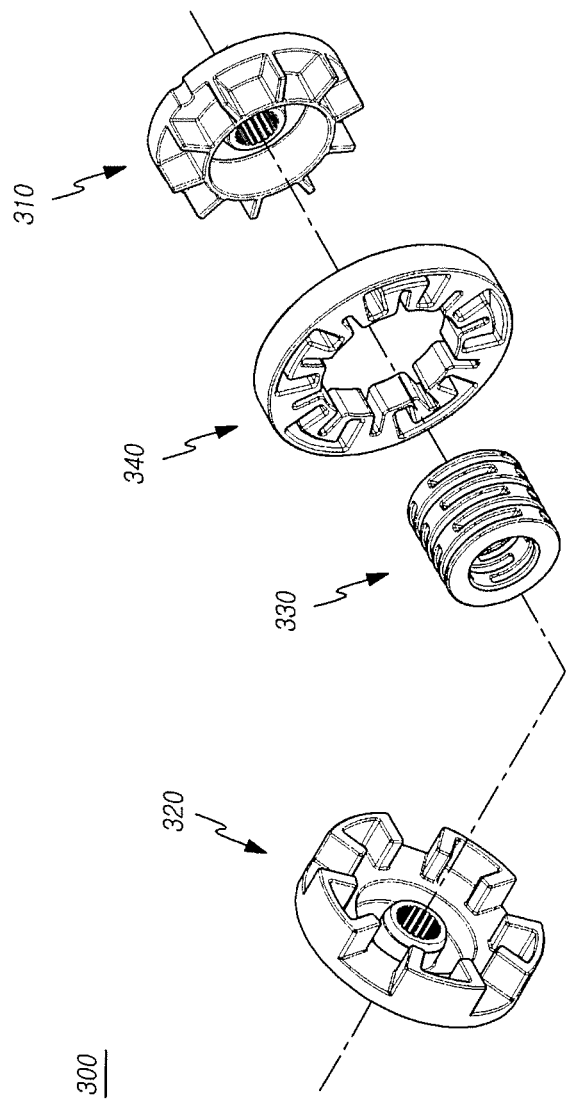
FIG. 4 is an exploded perspective view illustrating the power transmission member of the electric power steering system according to the present invention.
Figure 5:
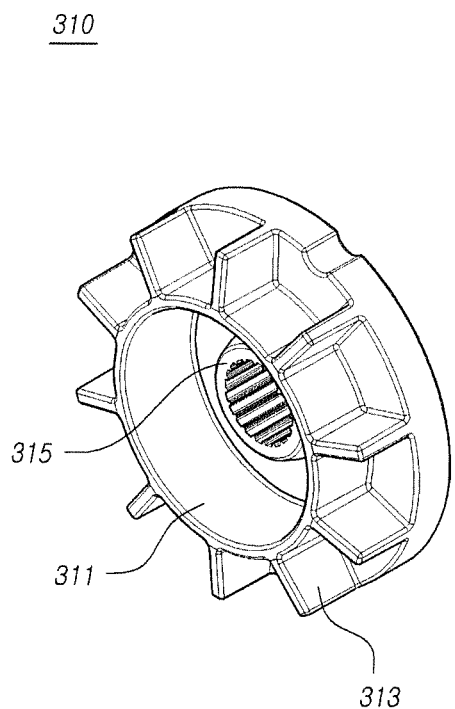
FIGS. 5 to 7 are perspective views illustrating the power transmission member of the electric power steering system according to the present invention.
Figure 6:
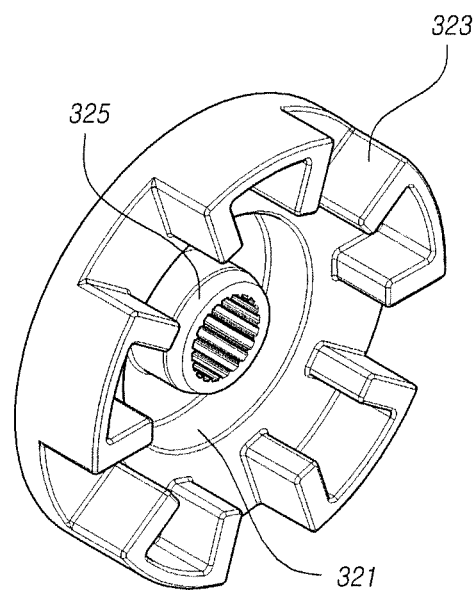
Figure 7:
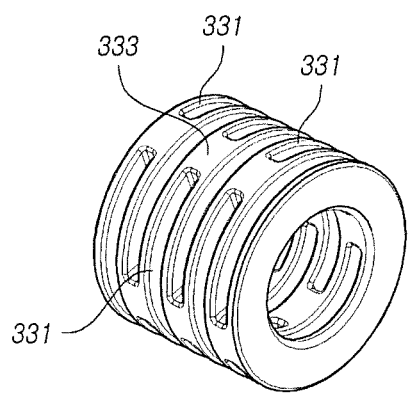
Figure 8:
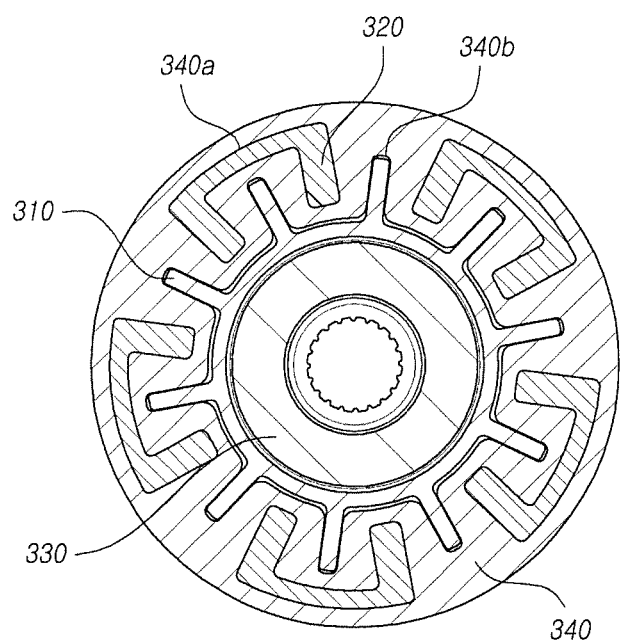
FIGS. 8 and 9 are sectional views illustrating the power transmission member of the electric power steering system according to the present invention.
Figure 9:
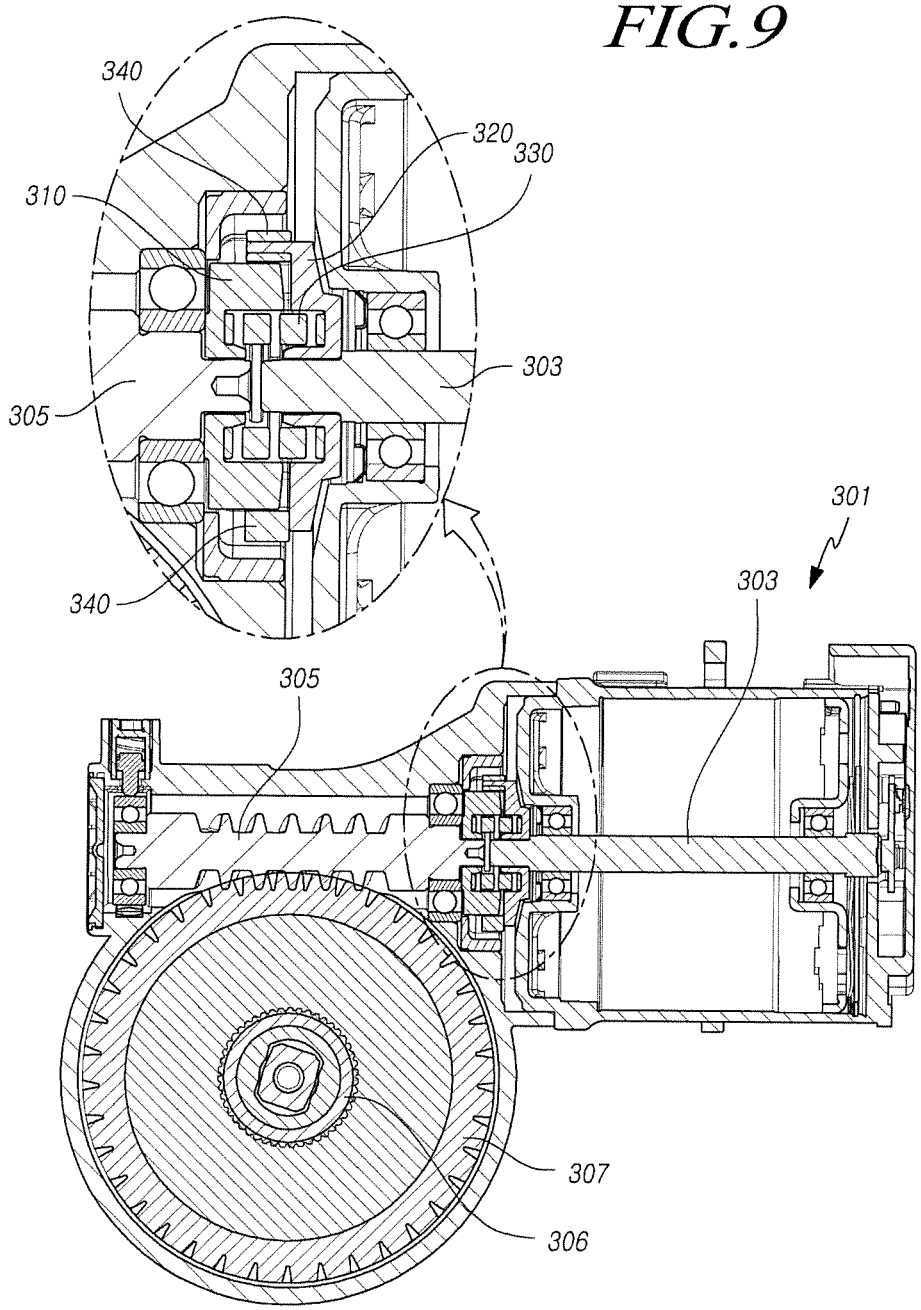

FIG. 3 is a perspective view illustrating a coupled state of a power transmission member of an electric power steering system according to the present invention. FIG. 4 is an exploded perspective view illustrating the power transmission member of the electric power steering system according to the present invention. FIGS. 5 to 7 are perspective views illustrating the power transmission member of the electric power steering system according to the present invention. FIGS. 8 and 9 are sectional views illustrating the power transmission member of the electric power steering system according to the present invention.

As illustrated in the drawings, the power transmission member 300 of the electric power steering system, according to the present invention, connects a driving shaft 303 and a driven shaft 305 on the same axis and transmits power between the driving shaft 303 and the driven shaft 305. The power transmission member 300 includes: a first boss 310 coupled to one of the driving shaft 303 and the driven shaft 305 and having a first receiving part 311 that is formed in the central portion thereof and has a cylindrical shape; a second boss 320 coupled to the other shaft and having a second receiving part 321 that is formed in the central portion thereof and has a cylindrical shape; and an axial damper 330 that elastically deforms in the axial direction while opposite end portions of the axial damper 330 are inserted into the first and second receiving parts 311 and 321.

The power transmission member 300 is coaxially connected with the driving shaft 303, which rotates while being connected with a power source (such as a motor, a pump, etc.), to transmit a rotational force from the power source to the driven shaft 305. An electric power steering system with a motor shaft as the driving shaft 303 and a worm shaft as the driven shaft 305 will be described as an example in the detailed description of the present invention.

Furthermore, it will be exemplified that the first boss 310 is coupled with the driven shaft 305 and the second boss 320 is coupled with the driving shaft 303.

For reference, in this case, the power transmission member 300 is used as a power connection device that connects the motor shaft, which generates auxiliary power of the electric power steering system, and the worm shaft to transmit the auxiliary power generated by the motor to a steering column 306 coupled with a worm wheel 307, thereby assisting with a driver's steering force.

The first boss 310 and the second boss 320 are coupled to the driven shaft 305 and the driving shaft 303, respectively, and the axial damper 330 is coupled between the first boss 310 and the second boss 320 such that the power transmission member 300 may coaxially connect the driving shaft 303 and the driven shaft 305 to transmit power therebetween.

The first and second bosses 310 and 320 have the first and second receiving parts 311 and 321 formed in the central portions thereof, and the first and second receiving parts 311 and 321 have a cylindrical shape. The axial damper 330 may elastically deform in the axial direction while opposite ends of the axial damper 330 are inserted into the first and second receiving parts 311 and 321.

The first boss 310 has a first shaft connecting part 315 protruding from the center of the first receiving part 311 in the axial direction. The first shaft connecting part 315 has an axial serration formed on the inner circumferential surface thereof, which prevents the driven shaft 305 from running idle, or being separated from the first shaft connecting part 315, when the driving shaft 303 is coupled to the first shaft connecting part 315.

The second boss 320 also has a second shaft connecting part 325 protruding from the center of the second receiving part 321 in the axial direction. The second shaft connecting part 325 has an axial serration formed on the inner circumferential surface thereof, which prevents slipping of the driving shaft 303 when the driving shaft 303 is coupled thereto.

The axial damper 330 coupled between the first and second bosses 310 and 320 as described above is formed in a cylindrical shape and has long cut-away holes 331 formed circumferentially through the inner and outer circumferential surfaces thereof in a circular arc shape.

Two or more cut-away holes 331 may be formed to be spaced apart from each other in the circumferential direction and to be symmetric to each other such that connection portions 333 are formed in the opposite positions between the cut-away holes 331.

Furthermore, the axial damper 330 may have a structure in which the cut-away holes 331 are arranged to be spaced apart from each other in the axial direction. In this case, the connection portions 333 are formed such that the axially adjacent cut-away holes 331 make a difference in the positions in the circumferential direction.

Accordingly, the axial damper 330 may more easily undergo elastic deformation in the axial direction, and the rigidity of the axial damper 330 may be maintained for a long period of time even though the axial damper 330 repeatedly expands and contracts in the axial direction.

The power transmission member 300 may further include a radial damper 340 to which the first boss 310 and the second boss 320 are coupled. The first boss 310 may have first protrusions 313 that are formed on the outside of the first receiving part 311 to protrude in the axial direction, and the second boss 320 may have second protrusions 323 that are formed on the outside of the second receiving part 321 to protrude in the axial direction.

The first protrusions 313 are formed in the shape of a radial rib on the outer circumferential surface of the first receiving part 311, and the radial damper 340 is formed in a cylindrical shape, the inner circumferential surface of which is coupled to the outer circumferential surface of the first receiving part 311, and has radial slits 340b formed on the inner circumferential surface thereof into which the first protrusions 313 are inserted.

The second protrusions 323 are provided to alternate with the first protrusions 313 in the circumferential direction. Each of the second protrusions 323 has a shape that surrounds the outer periphery of the corresponding first protrusion 313 and is formed such that opposite end portions thereof are spaced apart from the outer circumferential surface of the first receiving part 311.

The second protrusions 323 are formed in the shape of "⌒" that surrounds the opposite sides and the upper side of the first protrusion 313 and are arranged to alternate with the first protrusions 313 in the circumferential direction, and the radial damper 340 has insertion holes 340a between the inner and outer circumferential surfaces thereof into which the second protrusions 323 are inserted.

Accordingly, the first protrusions 313 of the first boss 310 coupled with the driven shaft 305 may effectively maintain its rigidity while transmitting a rotational force to the second boss 320, which is coupled with the driving shaft 303, through the radial damper 340 when the driving shaft 303 is rotated by the motor.

As described above, the first protrusions 313 and the second protrusions 323 are coupled to each other through the radial damper 340 without direct contact therebetween, which makes it possible to absorb noise caused by contact or impact.

While the first boss 310 and the second boss 320 are illustrated and described herein as having ten first protrusions 313 and five second protrusions 323, respectively, it should be understood that the present invention is not necessarily limited thereto.

The first boss 310 and the second boss 320 may be formed of a metal material, such as steel, or an engineering plastic based material, such as polyacetal (POM), polyamide (PA), polycarbonate (PC), polyimide (PI), polybutylene terephtalate (PBT), etc.

The axial damper 330 and the radial damper 340 may be formed of natural rubber (NR), nitrile butadiene rubber (NBR), chloroprene rubber (CR), ethylene propylene terpolymer (EPDM), fluoro rubber (FPM), styrene butadiene rubber (SBR), chlorosulphonated polyethylene (CSM), urethane, silicone, or the like, which has weather resistance and flexibility together with resilience, to serve as a damper for absorbing noise and vibration.

The axial damper 330 and the radial damper 340 may be formed to have the amount of compression of up to about 10% to 15% when an external force is not applied thereto, and the amount of compression may be varied according to the magnitude of a transmitted driving force.

According to the present invention, the power transmission member having the above-described structure and shape can more effectively reduce noise caused by the clearance between the inner and outer rotors, compared with a power transmission member in the related art, and can prevent noise caused by collision and vibration at the portion to which the driving shaft and the driven shaft are coupled while transmitting power.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present invention expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

| [Description of reference numerals] | |
| --- | --- |
| 300: Power transmission member | 303: Driving shaft |
| 305: Driven shaft | 310: First boss |
| 320: Second boss | 330: Axial damper |
| 340: Radial damper | |

What is claimed is:

1. A power transmission member for an electric power steering system that connects a driving shaft and a driven shaft on the same axis to transmit power therebetween, the power transmission member comprising:
   a first boss coupled to one of the driving shaft and the driven shaft and having a first receiving part that is formed in the central portion thereof and has a cylindrical shape;
   a second boss coupled to the other shaft and having a second receiving part that is formed in the central portion thereof and has a cylindrical shape;
   an axial damper configured to elastically deform in the axial direction while opposite end portions thereof are inserted into the first and second receiving parts; and
   a radial damper configured to elastically deform while the first boss and the second boss are partially inserted into the radial damper, the radial damper having an outer diameter greater than an outer diameter of the first boss and an outer diameter of the second boss.

2. The power transmission member of claim 1, wherein the first boss has a first shaft connecting part protruding from the center of the first receiving part in the axial direction, and the first shaft connecting part has an axial serration formed on the inner circumferential surface thereof.

3. The power transmission member of claim 2, wherein the second boss has a second shaft connecting part protruding from the center of the second receiving part in the axial direction, and the second shaft connecting part has an axial serration formed on the inner circumferential surface thereof.

4. The power transmission member of claim 1, wherein the axial damper is formed in a cylindrical shape and has cut-away holes formed circumferentially through the inner and outer circumferential surfaces thereof.

5. The power transmission member of claim 4, wherein the cut-away holes are formed to be spaced apart from each other in the circumferential direction and to be symmetric to each other such that connection portions are formed in the opposite positions between the cut-away holes.

6. The power transmission member of claim 5, wherein the cut-away holes of the axial damper are spaced apart from each other in the axial direction.

7. The power transmission member of claim 6, wherein the connection portions are formed such that the axially adjacent cut-away holes make a difference in the positions in the circumferential direction.

8. The power transmission member of claim 1, wherein the first boss has first protrusions that are formed on the outside of the first receiving part to protrude in the axial direction, and the second boss has second protrusions that are formed on the outside of the second receiving part to protrude in the axial direction, and
   wherein the radial damper elastically deforms while the first protrusions and the second protrusions are inserted into the radial damper.

9. The power transmission member of claim 8, wherein the first protrusions are formed in the shape of a radial rib on the outer circumferential surface of the first receiving part.

10. The power transmission member of claim 9, wherein the radial damper is formed in a cylindrical shape, the inner circumferential surface of which is coupled to the outer circumferential surface of the first receiving part, and has slits formed on the inner circumferential surface thereof into which the first protrusions are inserted.

11. The power transmission member of claim 8, wherein the second protrusions are provided to alternate with the first protrusions in the circumferential direction, and each of the second protrusions has a shape that surrounds the outer periphery of the corresponding first protrusion and is formed such that opposite end portions thereof are spaced apart from the outer circumferential surface of the first receiving part.

12. The power transmission member of claim 11, wherein the radial damper has insertion holes between the inner and outer circumferential surfaces thereof into which the second protrusions are inserted.

\* \* \* \* \*